United States Patent
Tzur et al.

(10) Patent No.: US 8,531,473 B2
(45) Date of Patent: Sep. 10, 2013

(54) PHOTOGRAMMETRIC TEXTURE MAPPING USING CASUAL IMAGES

(75) Inventors: Yochay Tzur, Haifa (IL); Ayellet Tal, Haifa (IL)

(73) Assignee: Technion R&D Foundation Ltd., Haifa (IL)

(*) Notice: Subject to any disclaimer, the term of this patent is extended or adjusted under 35 U.S.C. 154(b) by 337 days.

(21) Appl. No.: 12/843,156

(22) Filed: Jul. 26, 2010

(65) Prior Publication Data

US 2011/0025690 A1 Feb. 3, 2011

Related U.S. Application Data

(60) Provisional application No. 61/228,996, filed on Jul. 28, 2009.

(51) Int. Cl.
*G09G 5/00* (2006.01)

(52) U.S. Cl.
USPC ............................ 345/582; 345/583; 345/585

(58) Field of Classification Search
USPC .................................................. 345/582–588
See application file for complete search history.

(56) References Cited

U.S. PATENT DOCUMENTS

| 6,046,745 | A  | * | 4/2000  | Moriya et al. ............... | 345/420 |
| 6,281,904 | B1 | * | 8/2001  | Reinhardt et al. ............. | 345/582 |
| 6,476,803 | B1 | * | 11/2002 | Zhang et al. .................. | 345/419 |
| 6,912,293 | B1 | * | 6/2005  | Korobkin ..................... | 382/100 |
| 2005/0088435 | A1 | * | 4/2005  | Geng ............................ | 345/419 |
| 2005/0140670 | A1 | * | 6/2005  | Wu et al. ...................... | 345/419 |
| 2007/0220525 | A1 | * | 9/2007  | State et al. .................... | 718/107 |
| 2008/0159608 | A1 | * | 7/2008  | Suetens et al. ................ | 382/128 |
| 2010/0259540 | A1 | * | 10/2010 | Loop et al. .................... | 345/423 |

OTHER PUBLICATIONS

Tong-Yee Lee, Shao-Wei Yen, I-Cheng Yeh, Texture Mapping with Hard Constraints Using Warping Scheme 2008, IEEE Transactions on Visualization and Computer Graphics, 14(2):382-395.*
Kun Zhou, Xi Wang, Yiying Tong, Mathieu Desbrun, Baining Guo, Heung-Yeung Shum, TextureMontage: Seamless Texturing of Arbitrary Surfaces from Multiple Images, 2005, Proceedings of ACM SIGGRAPH 2005, 24(3):1148-1153.*
Bruno Lévy, Sylvain Petitjean, Nicolas Ray, Jérome Maillot, Least Squares Conformal Maps for Automatic Texture Atlas Generation, 2002, Proceedings of SIGGRAPH 2002, 21(3):362-371.*
Bruno Lévy, Constrained Texture Mapping for Polygonal Meshes, 2001, Proceedings of SIGGRAPH 2001, pp. 417-424.*
Scott Schaefer, Travis McPhail, Joe Warren, Image Deformation Using Moving Least Squares, 2006, Proceedings of ACM SIGGRAPH 2006, 25(3):533-540.*
Xianwang Wang, Qing Whang, Ruigang Yang, Brent Seales, Melody Carswell, Feature-Based Texture Mapping from Video Sequence, 2008, I3D '08 Proceedings of the 2008 Symposium on Interactive 3D Graphics and Games, Article 6, p. 1.*

* cited by examiner

*Primary Examiner* — Aaron M Richer
*Assistant Examiner* — Michael J Cobb
(74) *Attorney, Agent, or Firm* — Pearl Cohen Zedek Latzer, LLP

(57) ABSTRACT

A method for photogrammetric texture mapping using casual images is provided. The method may include the following steps: estimating, for each vertex of at least a portion of a three dimensional (3D) mesh representing a model, projection parameters associated with a virtual camera that is unique for each vertex; mapping pixels from a two dimensional (2D) image to the vertices, such that each mapping of a pixel is based on the estimated respective virtual camera parameters; and texturing the portion of the mesh with corresponding mapped pixels wherein vertices on the textured portion are selected such that they are visible from a specified viewpoint associated with the 3D mesh.

18 Claims, 5 Drawing Sheets

(EXISTING ART)

510

520

530

540

552

550

PHOTOGRAMMETRIC TEXTURE MAPPING USING CASUAL IMAGES

CROSS-REFERENCE TO RELATED APPLICATION

This application claims priority to U.S. Provisional Patent Application No. 61/228,996, filed Jul. 28, 2009, which is incorporated by reference in its entirety, as if fully set forth herein.

BACKGROUND

1. Technical Field

The present invention relates to computer graphics and more particularly, to texturing three-dimensional (3D) models with two-dimensional (2D) images.

2. Discussion of the Related Art

Texture mapping has been a fundamental issue in computer graphics from its early days. As online image databases have become increasingly accessible, the ability to texture 3D models using casual 2D images has gained importance. This will facilitate, for example, the task of texturing models of an animal using any of the hundreds of images of this animal found on the Internet, or enabling a naive user to create personal avatars using the user's own images. To texture a model using an image, a mapping from the surface to the image should be calculated. Given user-defined constraints, a common approach to establish this mapping is employing constrained parameterization. This approach computes the mapping by embedding the mesh onto the image plane, while attempting to satisfy the constraints and minimize a specific distortion metric. This approach is suitable for casual images, since no prior assumptions regarding the source image and the camera are made. However, inherent distortions might be introduced due to photography effects that result from the viewpoint and the object's 3D geometry.

FIG. 1 illustrates the aforementioned aspect of the existing art. A 3D mesh 11 representing a cylinder is provided together with a 2D image 12 containing a textured cylinder. Specifically, in image 12, the text appears curved and the squares in the center seem wider than those near the silhouettes. These photography effects result from the viewpoint and the object's 3D geometry. In mesh 11, a cylinder with different proportions is being used. Several pairs of constraints 11A/12A-11F/12F are specified thus geometrically associating mesh 11 with image 12. Both mesh 11 and image 12 are then fed into constrained parameterization texturing system 10 which yield a textured mesh 13. It is clearly shown from textured mesh 13 that the texture is distorted due to the dissimilarity in the shape of the cylinder of mesh 11 and the cylinder of image 12, as well as the different orientation of the cameras. Even when using a large number of constraints, constrained parameterization cannot produce a satisfactory mapping, since its two goals—minimizing distortions and satisfying constraints conflict.

If the cylinder of mesh 11 and the cylinder of image 12 were highly similar, a photogrammetric approach could solve the aforementioned distortion, by recovering the camera's parameters. Using these parameters to re-project the mesh 11 onto the image 12 would compensate for the photography effects. However, since mesh 11 and image 12 represent a-similar objects, the photogrammetric approach cannot be used.

BRIEF SUMMARY

Embodiments of the present invention overcome the drawbacks of both the constrained parameterization approach, which does not account for the photography effects, and the photogrammetric approach, which cannot handle arbitrary images. In order to achieve this, the mapping estimation is formulated as a problem for recovering local camera parameters at each vertex.

One aspect of the invention provides a method for photogrammetric texture mapping using casual images. The method may include the following steps: estimating, for each vertex of at least a portion of a 3D mesh representing a model, projection parameters associated with a virtual camera that is unique for each vertex; mapping pixels from a 2D image to the vertices, such that each mapping of a pixel is based on the estimated respective virtual camera parameters; and texturing the portion of the mesh with corresponding mapped pixels wherein vertices on the textured portion are selected such that they are visible from a specified viewpoint.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

Advantageously, embodiments of the present invention do not perform parameterization, but rather projection of the model according to the estimated local cameras. Therefore, issues such as fold-overs are not a concern, since the visibility determination step will address these.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
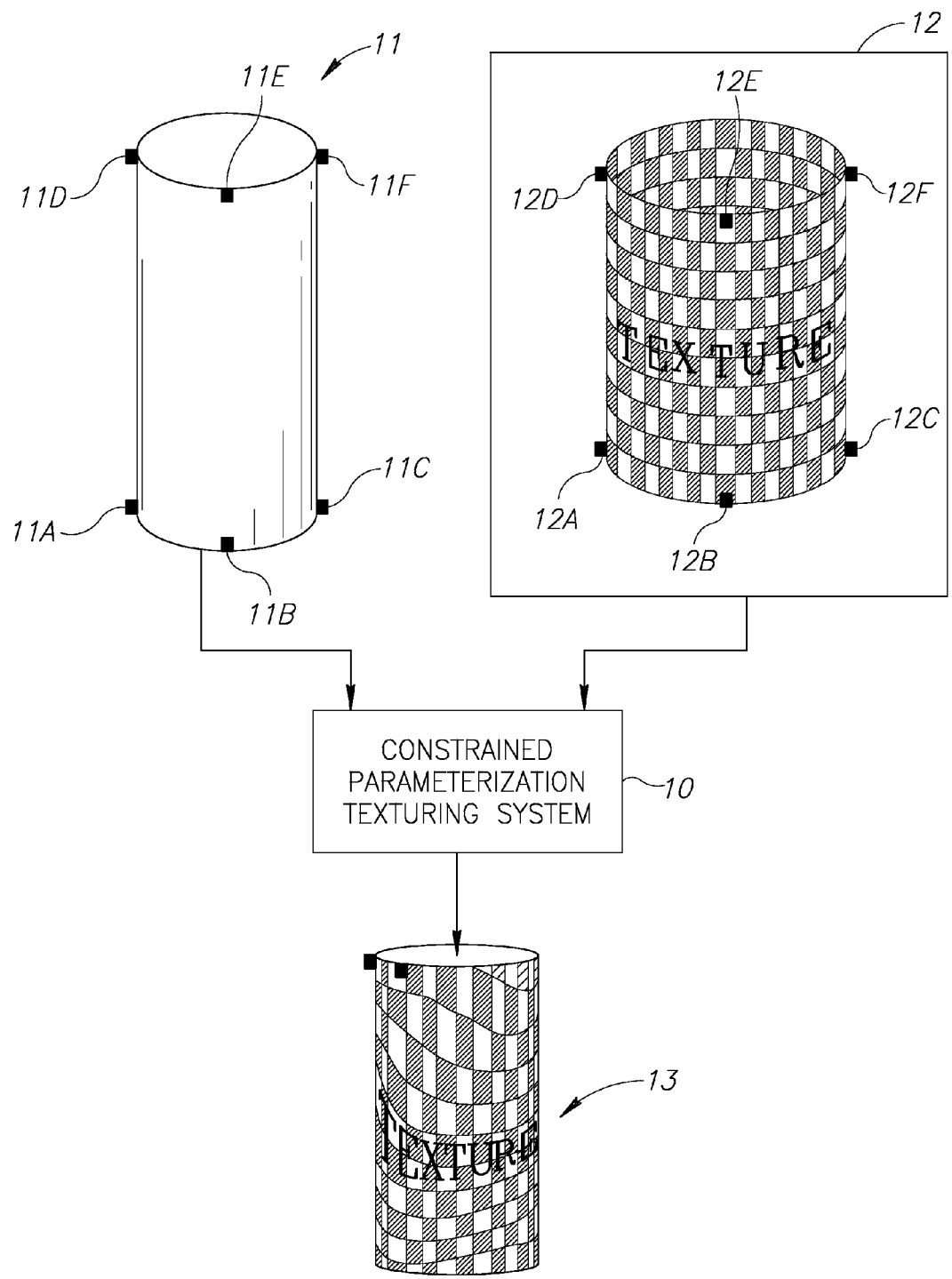
FIG. 1 is a high level flowchart illustrating an aspect according of the existing art.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "polygon mesh" or simply, "mesh" as used herein in this application refers to a collection of vertices, edges and surfaces that defines the shape of a polyhedral object in 3D computer graphics and solid modeling. The surfaces usually consist of triangles, quadrilaterals or other simple convex polygons. A vertex is a position along with other information such as color, normal vector and texture coordinates. An edge is a connection between two vertices. A surface is a closed set of edges, in which a triangle face has three edges, and a quad face has four edges.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
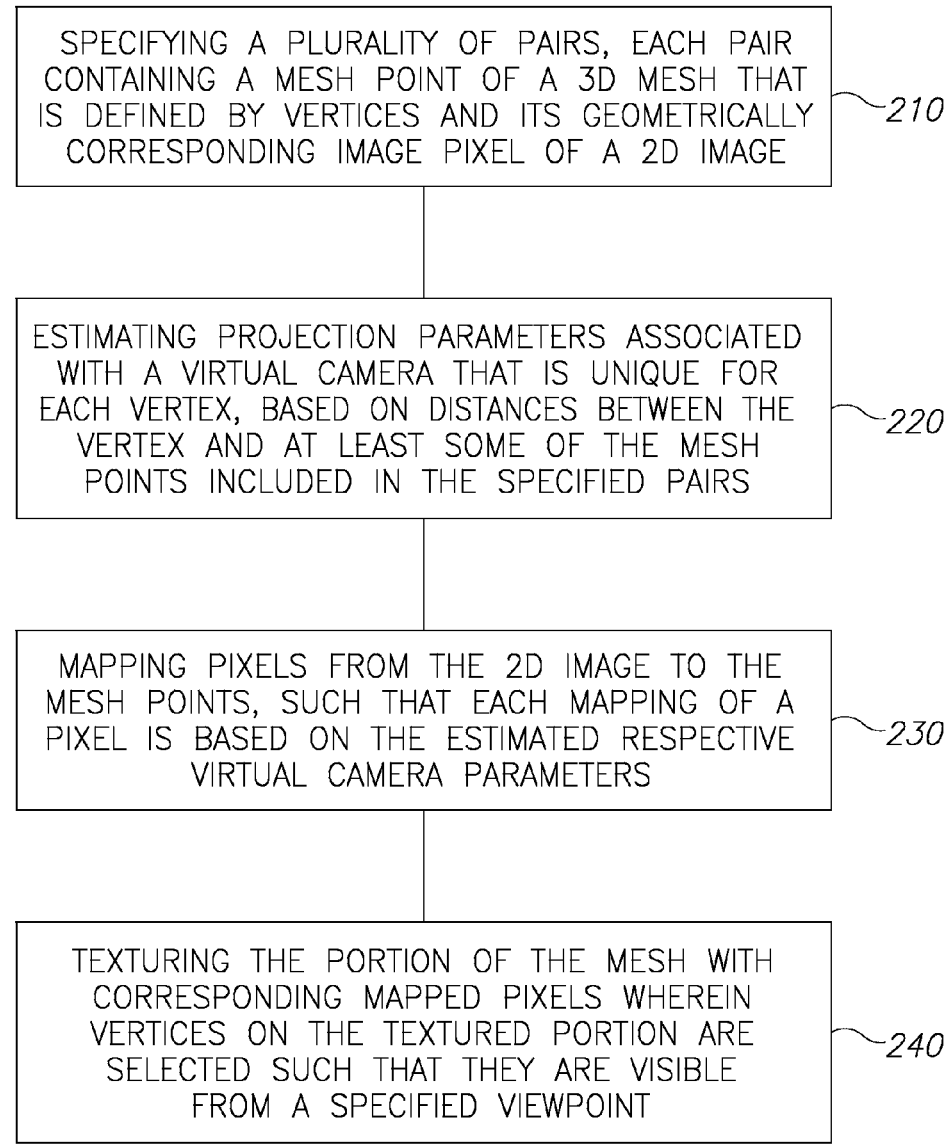
FIG. 2 is a high level flowchart illustrating a method according to some embodiments of the invention.

FIG. 2 is a high level flowchart illustrating a method 200 according to some embodiments of the invention. Method 200 may include the following steps: estimating, for each vertex of at least a portion of a 3D mesh representing a model, projection parameters associated with a virtual camera that is unique for each vertex 220. The method then goes on to mapping pixels from a 2D image to the vertices, such that each mapping of a pixel is based on the estimated respective virtual camera parameters 230. Then finally, the method goes on to texturing the portion of the mesh with corresponding mapped pixels wherein vertices on the textured portion are selected such that they are visible from a specified viewpoint 240.

Consistent with one embodiment of the invention, estimating step 220 may be preceded by the step of specifying a plurality of pairs, each pair containing a mesh point of the 3D mesh and its geometrically corresponding image pixel of the 2D image 210. Then, during estimating step 220, the projection parameters of any given vertex are calculated at least partially based on distances between the given vertex and at least some of the mesh points included in the specified pairs.

Consistent with one embodiment of the invention, the projection parameters of any given vertex may be computed based on a respective weighted projection error of mesh points included in the specified pairs. Specifically, the weighting of the weighted projection may be based at least partially on respective distances between the given vertex and at least some of the mesh points included in the specified pairs. The estimation may be carried out by finding the projection parameters that minimizes the weighted projection error function.

Consistent with one embodiment of the invention, the projection parameters account for the photogrammetric effects which are basically effects due to external and internal camera properties. To that extent, the external properties of the camera include its position and its orientation, wherein the internal properties of the camera include calibration parameters that are camera-unique. Both external and internal camera properties are estimates in the estimating step.

Consistent with one embodiment of the invention, method 200 may further include the step of determining the visible vertices based on a sum of distances between the vertex and the mesh points included in the specified pairs.

Consistent with one embodiment of the invention, determining the visible vertices may be carried out by first rasterizing the 3D mesh onto the 2D image while calculating sums of distances between each vertex and at least some of the mesh points included in the specified pairs, to yield a distance image aligned with the 2D image, such that each pixel of the distance image represents a respective minimal calculated sum. Then, by comparing, during the texturing, a depth associated with each mapped pixel with a respective pixel of the distance image, the visible vertices being the vertices associated with the respective minimal sums are determined.

Consistent with one embodiment of the invention, the model and a physical object contained within the 2D image are geometrically unrelated in terms of at least one of: pose, proportion, and articulation.

Figure 3:
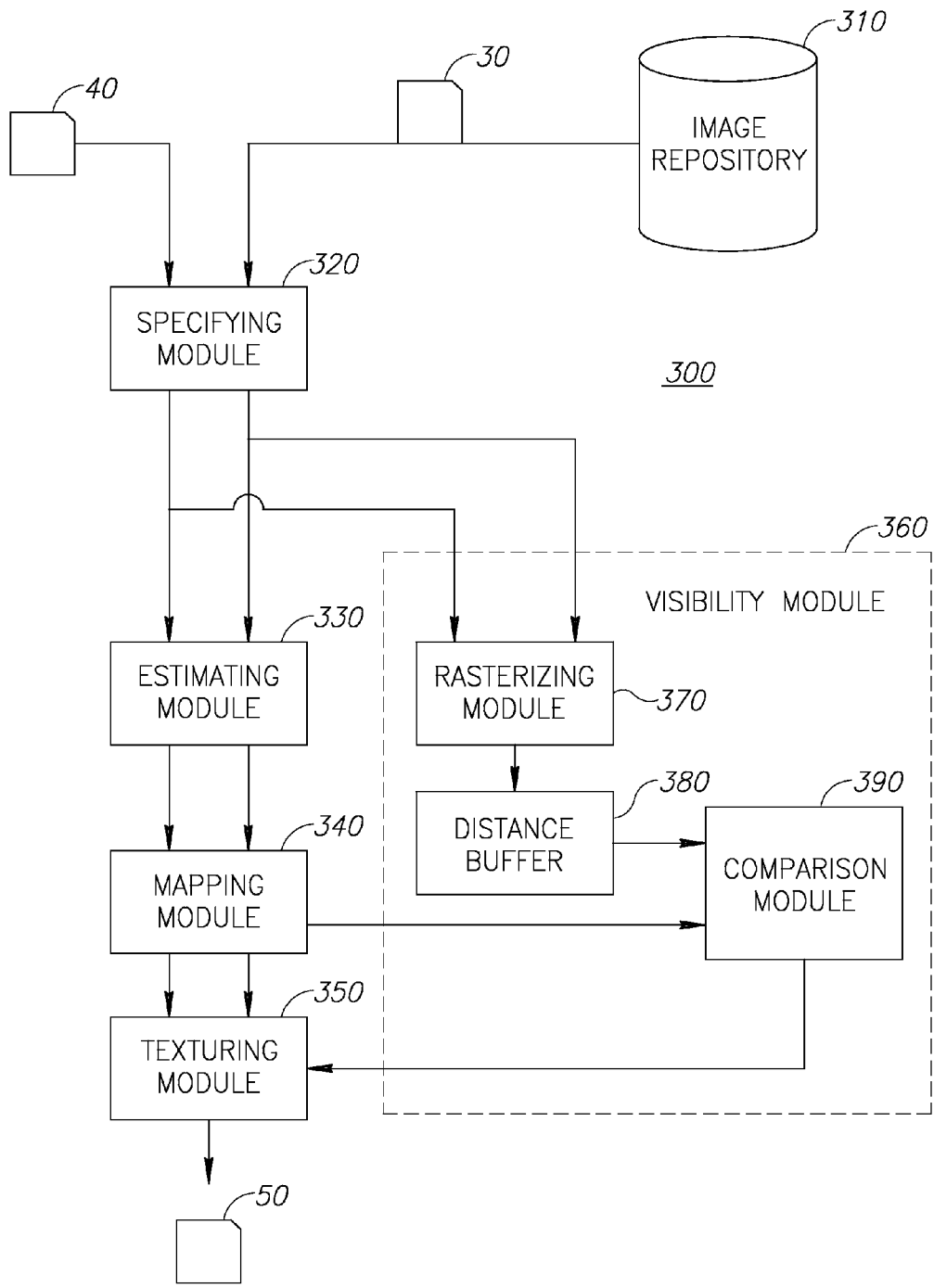
FIG. 3 is a high level block diagram illustrating a system according to some embodiments of the invention.

FIG. 3 is a high level block diagram illustrating a system according to some embodiments of the invention. System 300 may include an image repository 310 storing a plurality of arbitrary (casual) images, such as 2D image 30 that serves as an input for system 300. Another input of system 300 is a 3D mesh 40 representing a model 3D mesh 40 is defined by vertices which define surfaces containing mesh points. System 300 may further include an estimating module 330, a mapping module 340, a texturing module 350, and a visibility module 360. System 300 outputs a textured mesh 50 having the 3D geometrical features of 3D mesh 40 and the texture of 2D image 30.

In operation, estimating module 330 may be configured to estimate, for each vertex of at least a portion of a 3D mesh 40, projection parameters associated with a virtual camera that is unique for each vertex. Mapping module 340 may be configured to map pixels from a 2D image to the vertices, such that each mapping of a pixel is based on the estimated respective virtual camera parameters. Texturing module 350 may be configured to texture the portion of the mesh with corresponding mapped pixels. Visibility module 360 may be configured to determine which vertices of 3D mesh 40 are visibly for the viewpoint associated with 2D image 30. Specifically, only the mesh portion that contains the vertices that are visible from the viewpoint associated with 2D image 30 is being textured by texturing module 350.

Consistent with one embodiment of the invention, system 300 may further include a specifying module 320 configured to specify, possibly but not necessarily, responsive of a user selection, a plurality of pairs representing constraints associating 2D image 30 with 3D mesh 40. Specifically, each pair contains a mesh point of 3D mesh 40 and its geometrically corresponding image pixel of 2D image 30. Further, estimating module 330, may be configured to calculate the projection parameters of any given vertex at least partially based on distances between the given vertex and at least some of the mesh points included in the specified pairs.

Figure 4:
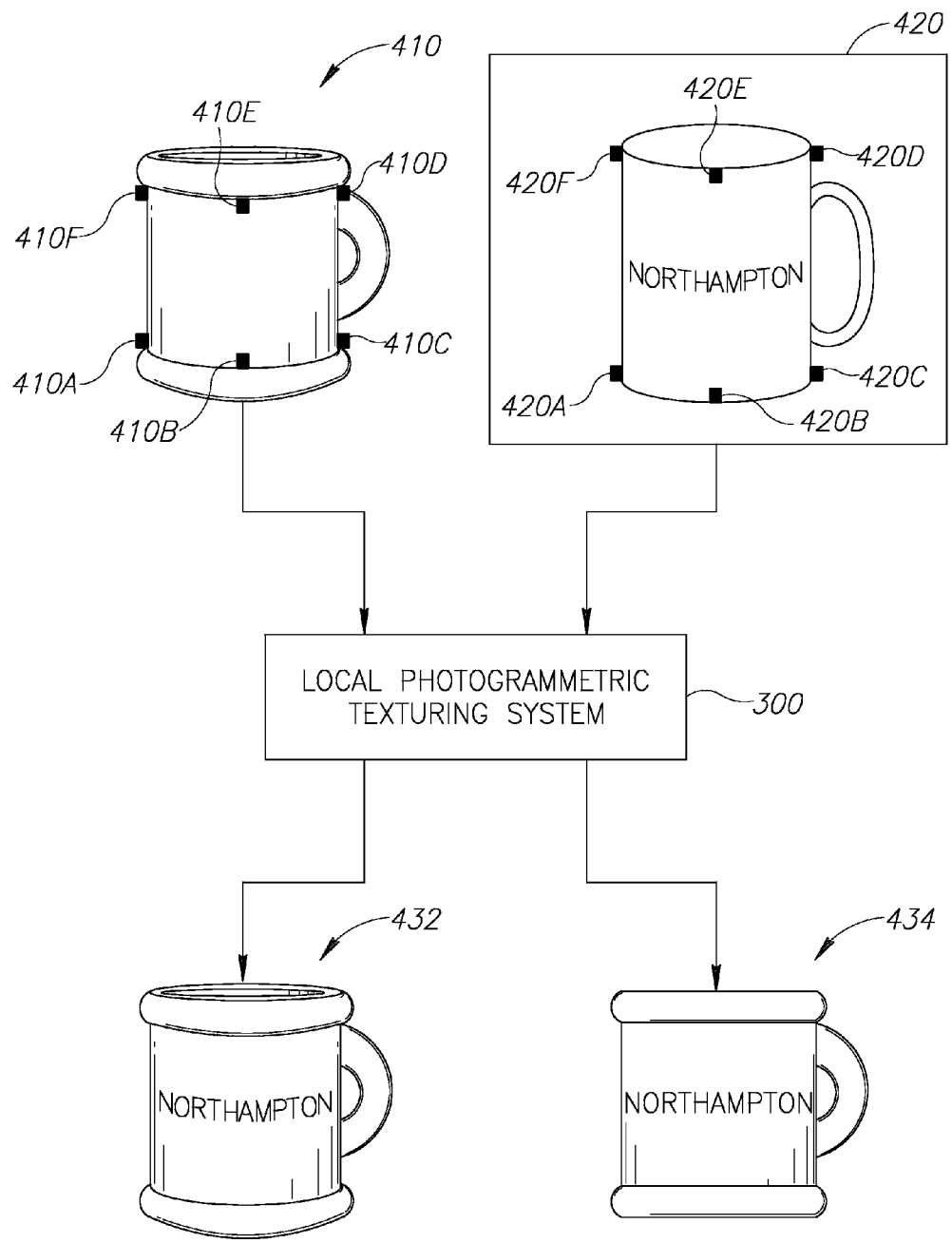
FIG. 4 is a high level flowchart illustrating an aspect according to some embodiments of the invention.

FIG. 4 is a flowchart illustrating an aspect according to some embodiments of the invention. A 3D mesh (model) 410 is shown together with a 2D image 420. It is clearly seen that the mug of mesh 410 and the mug of image 420 are not the same mug. Several constraints have been specified associating image 420 and mesh 410 in the form of pairs 410A/420A-410F/420F. Both image 420 and mesh 410 are inputted into the aforementioned system 300. Possible output is textured mesh, viewed from two different viewpoints 432 and 434. It is clearly seen on textured mesh 432, that unlike textured mesh 13 of FIG. 1, the texture of image 420 conforms with the geometry of mesh 410. In addition, the level and nature of the curved text in image 420 is maintained in textured mesh 432. Textured mesh 434 is shown in orthographic projection, thus showing that the mapping of the texture maintains the text on the mug in parallel to the mug's top and bottom thus compensating for the photographic effects caused by the camera properties (e.g. orientation and position) in image 420.

Returning to FIG. 3, estimating module 330 may be further configured to compute the projection parameters of any given vertex based on a respective weighted projection error of mesh points included in the specified pairs. Specifically, the weighting of the weighted projection may be based at least partially on respective distances between the given vertex and at least some of the mesh points included in the specified pairs.

An exemplary process by which the local camera parameters are being calculated for each vertex is by defining a mesh to image transformation for each vertex. The mesh to image transformation maps a mesh point to an image pixel takes into account the external and the internal properties of the local camera. Calculating the transformations is achieved by weighting the constraints pairs differently at each vertex, in contrast to the global case, according to their distance from the vertex.

Various weighting schemes are possible. In a non-limiting weighting scheme, the weights may be defined according to their proximity in terms of the geodesic distance points on the mesh surface (a constraint and a vertex).

Under the assumption of a simple camera, and assuming also that the camera has a uniform scaling in both axes, a specified error function unique for each vertex may be defined and computed. Then, the virtual camera parameters are those that minimize the specified error function. The aforementioned assumption comply with available casual images (e.g., from the internet) but it is further understood that other error function may be defined and calculated on an ad hoc basis in order to extract other local cameras projection parameters.

Consistent with one embodiment of the invention visibility module 360 may be configured to determine the visible vertices based on a respective sum of distances between the vertex and the mesh points included in the specified pairs. Visibility module 360 may include a rasterizing module 370 configured to rasterize 3D mesh 40 onto 2D image 30 while calculating sums of distances between each vertex and at least some of the mesh points included in the specified pairs, to yield a distance buffer 380 aligned with the 2D image, such that each pixel of the distance image represents a respective minimal calculated sum. Visibility module 360 may further include a comparison module 390 configured to compare, a sum of distances associated with each mapped pixel with a respective pixel of the distance buffer, to determine the visible vertices being the vertices associated with the respective minimal sums.

It should be noted that the use of visibility module 360 is required due to the use of camera projection. Camera projection usually maps at least two mesh points to each image pixel (the model's front and back), from which only one should be textured, while the others should be considered invisible. An inherent property of the constrained parameterization approach is that at most one mesh point is mapped to each image point. In the global photogrammetric approach, the visibility issue is addressed using visible surface detection, (for example, by a Z-Buffer storing the depth of the depth atlas of the model). Although a Z-Buffer cannot be used in order to detect visibility with local cameras (as the global depth of the model is unknown), it would be possible to modify existing hardware supporting Z-Buffer, to implement the aforementioned distance buffer 380.

Figure 5:
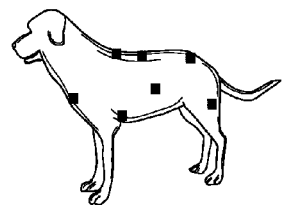
FIG. 5 illustrates an aspect according to some embodiments of the invention.
Figure 5:
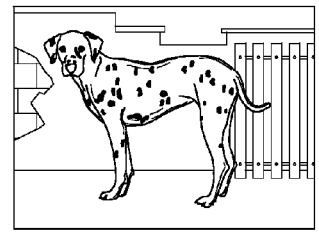
Figure 5:
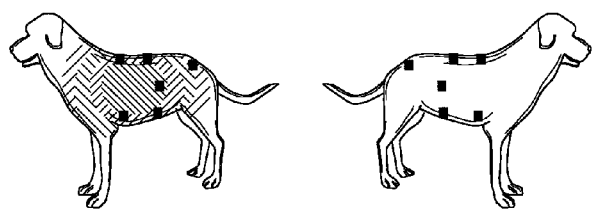
Figure 5:
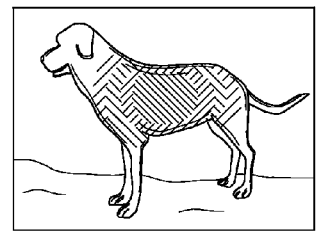
Figure 5:
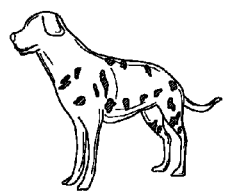
Figure 5:
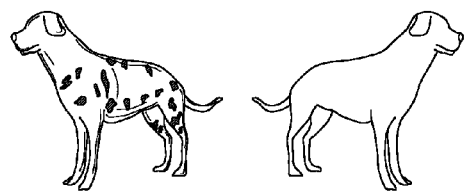

FIG. 5 illustrates the visibility aspect according to some embodiments of the invention. There is provided a 3D mesh 510 and a 2D image 520. It should be noted that not only the dog in mesh 510 differs in proportion and pose from the dog in image 520; they also differ in articulation, as the dog in 510 looks forward whereas the dog in image 520 looks at the viewer (camera).

Using the constraints (pairs) associating mesh 510 and image 520, a distance buffer 540 is computed. Distance buffer 540 stores the minimal sum of distances for each vertex on the mesh, from the constraints points of the mesh. This is useful when there are more than one mesh point that may be mapped onto a single image pixel. This could happen, for example, on the dogs legs, where each leg has a front side and back side (from viewer perspective)—a total of four points of mesh 510 that need to be mapped into a single pixel from image 520.

Model 530 shows the distance buffer 540 embedded thereon showing on the left—the front side of the dog (with the minimal sums of distances) and the back side of the dog with no minimal sums. This conforms to reality as the textured side is the front side. Textured models 550 and 552 show how the texture of image 520 is mapped onto mesh 510 wherein in 552 no distance buffer is used so that the back of the dog is also textured mistakenly. In 550 the distance buffer is used to determine the visible vertices so that only the visible front side of the dog has been textured.

Consistent with embodiments of the invention, a software tool implementing method 200 or system 300 may further be provided. The software tool may provide iterative process supported by an appropriate Graphical User Interface (GUI) that may improve the texturing process in response to user selection. For example, the user may start with specifying a small number of feature points (at least five) both on the model and on the source image. Given these constraints, embodiments of method 200 calculate the mapping and texture the model in an interactive manner. The user can then improve the result, by either adding more constrains (pairs) or adjusting the positions of the existing constraints. Each modification to the constraints initiates the recalculation of the mapping and the texturing.

Advantageously, embodiments of the present invention provide texturing 3D models from casual images that need not conform to the geometry (proportion, pose, and articulation) of the model. Moreover, as seen above, embodiments of the present invention provide the advantages of the photogrammetric approach and the flexibility of the constrained-parameterization approach.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   estimating, for each vertex of at least a portion of a 3D mesh containing mesh points representing a model, projection parameters associated with a virtual camera that is unique for each vertex;
   mapping pixels from a 2D image to the vertices, such that each mapping of a pixel is based on the estimated respective virtual camera parameters;
   texturing the portion of the mesh with corresponding mapped pixels, wherein vertices on the textured portion are selected such that they are visible from a specified viewpoint associated with the 3D mesh;
   specifying a plurality of pairs, each pair containing a mesh point of the 3D mesh and its geometrically corresponding image pixel of the 2D image, wherein during the estimating, the projection parameters of any given vertex are calculated at least partially based on distances between the given vertex and at least some of the mesh points included in the specified pairs;
   rasterizing the 3D mesh onto the 2D image while calculating sums of distances between each vertex and at least some of the mesh points included in the specified pairs, to yield a distance image aligned with the 2D image, such that each pixel of the distance image represents a respective minimal calculated sum; and
   comparing, during the texturing, a depth associated with each mapped mesh points with a respective pixel of the distance image, to determine the visible vertices being the vertices associated with the respective minimal sums.

2. The method according to claim 1, wherein the projection parameters of any given vertex are further computed based on a respective weighted projection error of mesh points included in the specified pairs, wherein weighting of the weighted projection is based at least partially on respective distances between the given vertex and at least some of the mesh points included in the specified pairs.

3. The method according to claim 2, wherein the projection parameters of any given vertex are further computed based on a minimizing of the respective weighted projection error.

4. The method according to claim 1, wherein the projection parameters comprise at least one of: a position, an orientation, and a calibration associated with the virtual camera located within a specified distance from each one of the vertices.

5. The method according to claim 1, further comprising determining the visible vertices based on a sum of distances between the vertex and the mesh points included in the specified pairs.

6. The method according to claim 1, wherein the model and a physical object contained within the 2D image are geometrically unrelated in terms of at least one of: a pose, a proportion, and an articulation.

7. A system comprising:
   at least one computer processor;
   an estimating module configured to estimate, for each vertex of at least a portion of a 3D mesh containing mesh points and representing a model, projection parameters associated with a virtual camera that is unique for each vertex;
   a mapping module configured to map pixels from a 2D image to the vertices, such that each mapping of a pixel is based on the estimated respective virtual camera parameters;
   a texturing module configured to texture the portion of the mesh with corresponding mapped pixels wherein vertices on the textured portion are selected such that they are visible from a specified viewpoint,
   a specifying module configured to specify, responsive of a user selection, a plurality of pairs, each pair containing a mesh point of the 3D mesh and its geometrically corresponding image pixel of the 2D image and wherein the estimating module is further configured to calculate the projection parameters of any given vertex at least partially based on distances between the given vertex and at least some of the mesh points included in the specified pairs;
   a rasterizing module configured to rasterize the 3D mesh onto the 2D image while calculating sums of distances between each vertex and at least some of the mesh points included in the specified pairs, to yield a distance buffer aligned with the 2D image, such that each pixel of the distance image represents a respective minimal calculated sum; and
   a comparison module configured to compare, a sum of distances associated with each mapped mesh point with a respective pixel of the distance buffer, to determine the visible vertices being the vertices associated with the respective minimal sums, wherein the modules are executed by said at least one computer processor.

8. The system according to claim 7, wherein the estimating module is further configured to compute the projection parameters of any given vertex based on a respective weighted projection error of mesh points included in the specified pairs, wherein a weighting of the weighted projection is based at least partially on respective distances between the given vertex and at least some of the mesh points included in the specified pairs.

9. The system according to claim 8, wherein the estimating module is further configured to calculate the projection parameters of any given vertex are further computed based on a minimizing of the respective weighted projection error.

10. The system according to claim 7, wherein the projection parameters comprise at least one of a position, an orientation, and a calibration associated with the virtual camera located within a specified distance from each one of the vertices.

11. The system according to claim 7, further comprising a visibility module configured to determine the visible vertices based on a respective sum of distances between the vertex and the mesh points included in the specified pairs.

12. The system according to claim 7, wherein a physical object represented by the 3D mesh and a physical object contained within the 2D image are geometrically unrelated in terms of at least one: a pose, a proportion, and an articulation.

13. A computer program product, the computer program product comprising a computer readable storage non-transitory medium having computer readable program embodied therewith, the computer readable program comprising:
   computer readable program configured to estimate, for each vertex of at least a portion of a 3D mesh containing mesh points and representing a model, projection parameters associated with a virtual camera that is unique for each vertex;
   computer readable program configured to map pixels from a 2D image to the vertices, such that each mapping of a pixel is based on the estimated respective virtual camera parameters;
   computer readable program configured to texture the portion of the mesh with corresponding mapped pixels wherein vertices on the textured portion are selected such that they are visible from a specified viewpoint associate with the 3D mesh;
   computer readable program configured to specify, responsive of a user selection, a plurality of pairs, each pair containing a mesh point of the 3D mesh and its geometrically corresponding image pixel of the 2D image;
   computer readable program configured to calculate the projection parameters of any given vertex at least partially based on distances between the given vertex and at least some of the mesh points included in the specified pairs; computer readable program configured to rasterize the 3D mesh onto the 2D image while calculating sums of distances between each vertex and at least some of the mesh points included in the specified pairs, to yield a distance buffer aligned with the 2D image, such that each pixel of the depth image represents a respective minimal calculated sum; and
   computer readable program configured to compare, a sum of distances associated with each mapped mesh point with a respective pixel of the distance buffer, to determine the visible vertices being the vertices associated with the respective minimal sums.

14. The computer program product according to claim 13, further comprising computer readable program configured to compute the projection parameters of any given vertex based on a respective weighted projection error of mesh points included in the specified pairs, wherein a weighting of the weighted projection is based at least partially on respective distances between the given vertex and at least some of the mesh points included in the specified pairs.

15. The computer program product according to claim 14, further comprising computer readable program configured to calculate the projection parameters of any given vertex are further computed based on a minimizing of the respective weighted projection error of the specified pairs.

16. The computer program product according to claim 13, wherein the projection parameters comprise at least one of: a position, an orientation, and a calibration associated with the virtual camera located within a specified distance from each one of the vertices.

17. The computer program product according to claim 13, further comprising computer readable program configured to determine the visible vertices based on a sum of distances between the vertex and the mesh points included in the specified pairs.

18. The computer program product according to claim 13, wherein a physical object represented by the 3D mesh and a physical object contained within the 2D image are geometrically unrelated in terms of at least one: a pose, a proportion, and an articulation.

* * * * *